United States Patent
Zhang et al.

(10) Patent No.: US 7,446,014 B2
(45) Date of Patent: Nov. 4, 2008

(54) NANOELECTROCHEMICAL CELL

(75) Inventors: Fengyan Zhang, Vancouver, WA (US); David R. Evans, Beaverton, OR (US); Sheng Teng Hsu, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 134 days.

(21) Appl. No.: 11/580,623

(22) Filed: Oct. 12, 2006

(65) Prior Publication Data
US 2008/0096345 A1 Apr. 24, 2008

(51) Int. Cl.
*H01L 21/20* (2006.01)

(52) U.S. Cl. .................. 438/399; 438/239; 438/329; 257/81; 257/88; 257/99; 977/762

(58) Field of Classification Search .............. 438/171, 438/239, 329, 381, 399, 618; 257/13, 79, 257/81, 88, 99; 977/762
See application file for complete search history.

(56) References Cited

U.S. PATENT DOCUMENTS

| | | | |
|---|---|---|---|
| 7,358,524 B2* | 4/2008 | Lee et al. | 257/14 |
| 2005/0227391 A1* | 10/2005 | Jin et al. | 438/22 |
| 2007/0032076 A1* | 2/2007 | Lee et al. | 438/666 |
| 2007/0048589 A1* | 3/2007 | Koripella et al. | 429/38 |
| 2007/0200477 A1* | 8/2007 | Tuominen et al. | 313/309 |
| 2008/0041446 A1* | 2/2008 | Wu et al. | 136/263 |
| 2008/0072961 A1* | 3/2008 | Liang et al. | 136/263 |

OTHER PUBLICATIONS

"Ordered Organic-Inorganic Bulk Heterojunction Photovoltaic Cells", Coakley et al., MRS Bulletin, vol. 30, Jan. 2005, p. 37-40.
"Dye-Sensitized Solid State Heterojunction Solar Cells", Michael Gratzel, MRS Bulletin, vol. 30, Jan. 2005, p. 23-27.

* cited by examiner

*Primary Examiner*—Fernando L Toledo
(74) *Attorney, Agent, or Firm*—Law Office of Gerald Maliszewski; Gerald Maliszewski

(57) ABSTRACT

A method is provided for forming a NanoElectroChemical (NEC) cell. The method provides a bottom electrode with a top surface. Nanowire shells are formed. Each nanowire shell has a nanowire and a sleeve, with the nanowire connected to the bottom electrode top surface. A top electrode is formed overlying the nanowire shells. A main cavity is formed between the top electrode and bottom electrodes, partially displaced by a first plurality of nanowire shells. Electrolyte cavities are formed between the sleeves and nanowires by etching the first sacrificial layer. In one aspect, electrolyte cavities are formed between the bottom electrode top surface and a shell coating layer joining the sleeve bottom openings. Then, the main and electrolyte cavities are filled with either a liquid or gas phase electrolyte. In a different aspect, the first sacrificial layer is a solid phase electrolyte that is not etched away.

20 Claims, 6 Drawing Sheets

NANOELECTROCHEMICAL CELL

BACKGROUND OF THE INVENTION

1. Field of the Invention

This invention generally relates to integrated circuit (IC) and semiconductor processes and, more particularly, to a NanoElectroChemical (NEC) cell and associated fabrication process.

2. Description of the Related Art

Nanowire structure electrodes are being incorporated into a number of thin-film electrical devices. The combination of many nanowires attached to an electrode provides a larger overall surface area than a conventional flat-surface electrode, improving electrical performance. However, the relatively fine structure of individual nanowires is necessarily more prone to breakage and physical damage. Nanowires are an ineffective means of interlevel mechanical support. One method of improving mechanical interlevel support is to fill the space surrounding the nanowires with dielectric, leaving just the nanowire tips exposed. But the fill between nanowires reduces the overall surface area of the nanowire electrode.

It would be advantageous if a nanowire support structure could be formed to maximize the nanowire surface area, while providing mechanical support.

SUMMARY OF THE INVENTION

The present invention NanoElectroChemical cell can be used to electrochemically fabricate or dissociate chemicals for environmental, sensor, energy storage, bio and chemical applications. The NanoElectroChemical cell has large surface area and nanospaces between the cathodes and anodes that significantly improve the performance of the electrochemical performance. Additionally, a nanowire shell structure is provided to mechanically support the nanowires.

Accordingly, a method is provided for forming a NanoElectroChemical (NEC) cell. The method provides a bottom electrode with a top surface. Nanowire shells are formed. Each nanowire shell has a nanowire and a sleeve, with the nanowire connected to the bottom electrode top surface and the sleeve (optionally) covering a nanowire tip. A top electrode is formed overlying the nanowire shells. A main cavity is formed between the top electrode and bottom electrodes, partially displaced by a first plurality of nanowire shells. A support column, approximately centered under the top electrode, also helps to define the main cavity.

The nanowire shells are formed by conformally coating the nanowires with a first sacrificial coating, and then conformally covering the first sacrificial coating with a shell coating. Optionally, the shell coating may be anisotropically etched. A second sacrificial layer is blanket deposited and planarized to the level of the shell coating. Then, the top electrode is conformally deposited and selectively etching around a perimeter, down to the level of the bottom electrode top surface, forming an area of nanowire shells defined by the perimeter. In response to the etching, the shell coating is broken along the perimeter, and the first sacrificial layer is exposed. The second sacrificial layer is then partially etched, leaving the support column (made from unetched second sacrificial material).

In one aspect, electrolyte cavities are formed between the sleeves and nanowires, and an electrolyte cavity may also be formed between the bottom electrode top surface and a shell coating layer joining the sleeve openings, by etching away the first sacrificial layer. Then, the main and electrolyte cavities are filled with either a liquid or gas phase electrolyte. In a different aspect, the first sacrificial layer is a solid phase electrolyte that is not etched away.

Additional details of the above-described method, a corresponding NEC cell, and a nanowire support structure are described below.

DETAILED DESCRIPTION

Figure 1A:
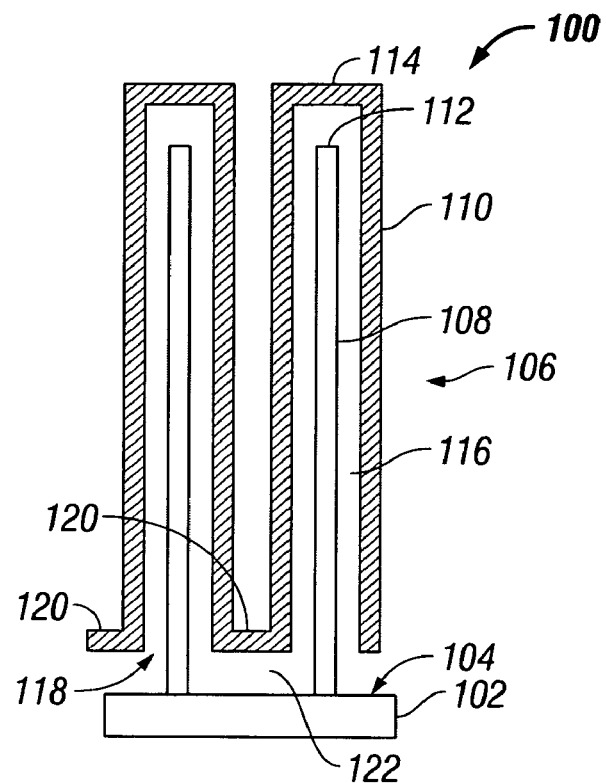
FIGS. 1A and 1B are partial cross-sectional views of a nanowire support structure.
Figure 1B:
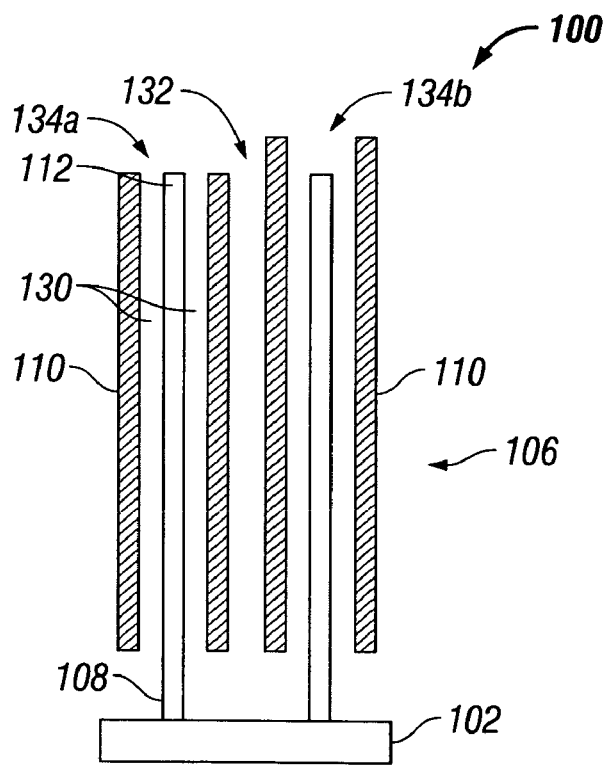

FIGS. 1A and 1B are partial cross-sectional views of a nanowire support structure. In FIG. 1A, the support structure 100 comprises a bottom substrate 102 with a top surface 104. A plurality of nanowire shells 106 is shown. Each nanowire shell 106 has a nanowire 108 and a sleeve 110. The nanowire 108, which may alternately be referred to as a nanostructure or nanorod, is connected to the bottom substrate top surface 104, and the sleeve 110 may cover a nanowire tip 112 with a lid 114, as shown. Sleeve cavities 116 are interposed between each sleeve 110 and nanowire 108. In some aspects, the bottom substrate 102 and nanowires 108 are made from a conductive material and may function as an electrode. However, in other aspects, nonconductive materials may be used.

Each sleeve 110 also has a sleeve bottom opening 118. A shell coating layer 120 overlies the, bottom substrate top surface 104 and joins the plurality of sleeve openings 118. A surface cavity 122 is interposed between the shell coating layer 120 and the bottom substrate top surface 104. In one aspect, the sleeve cavities 116 and surface cavities 122 are filled with a solid material, such as a dielectric or a solid electrolyte. Exemplary dimensions and materials are provided below in the description of the NanoElectroChemical cell of FIG. 2A.

FIG. 1B depicts a variation of the support structure where the sleeve lids and shell coating 120 are not formed. As shown with the left nanowire shell, the sleeve top opening 134a may be at the level of the nanowire tip 112. As shown with the right nanowire shell 106, the top opening 134b may extend beyond the tip 112. Although not shown as such in this figure, the sleeve top openings are typically planarized to a common level. In this variation the sleeve cavities are filled with a solid material 130. This space may also be filled with a gas or liquid if the sleeves are supported by an underlying or an overlying layer (not shown). The space 132 between sleeves may be unfilled, filled with solid material 130, partially filled with material 130, or filled with layers of solid material.

Figure 2A:
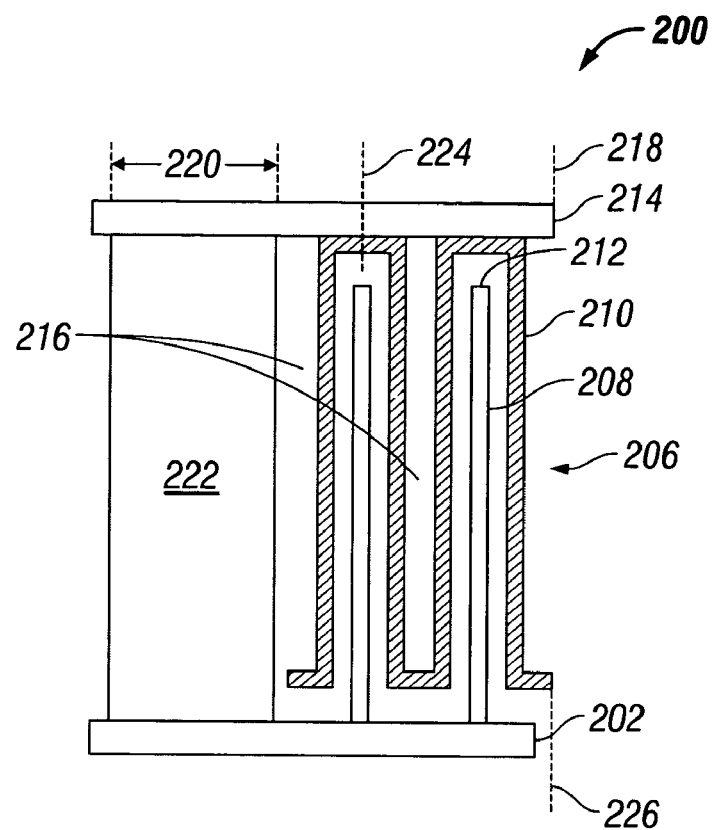
FIGS. 2A and 2B are partial cross-sectional views depicting different aspects of a NanoElectroChemical (NEC) cell.
Figure 2B:
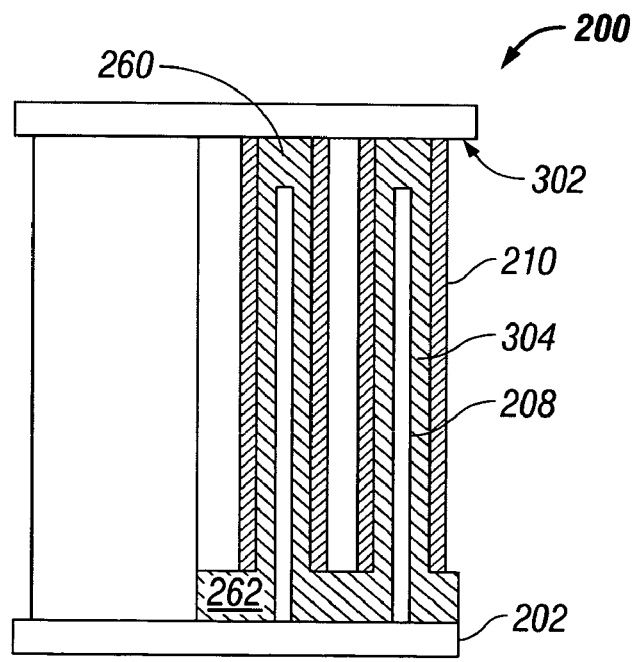

FIGS. 2A and 2B are partial cross-sectional views depicting different aspects of a NanoElectroChemical (NEC) cell. The NEC cell 200 of FIG. 2A comprises a bottom electrode 202 with a top surface 204. A plurality of nanowire shells 206 is formed. Each nanowire shell 206 has a nanowire 208 and a sleeve 210. The nanowire 208 is connected to the bottom electrode top surface 204. In one aspect, as shown, the sleeve 210 covers a nanowire tip 212. A top electrode 214 overlies the nanowire shells 206. A main cavity 216 is formed between the top electrode 214 and bottom electrode 202, partially displaced by a first plurality of nanowire shells 206.

The top electrode 214 has a perimeter 218 with a center region 220. A support column 222 underlies the top electrode center region 220 and extends to the bottom electrode top surface 204, partially defining the main cavity 216. A plurality of nanowire shells (not shown) may be embedded in the support column 222. The nanowires 208 have an axis 224 approximately normal in orientation with respect to the bottom electrode top surface 204. As shown, the nanowire shells 206 are formed in an area defined by a perimeter 226 aligned with the top electrode perimeter 218. Although the drawing implies that only 2 nanowire shells exist between the support column 222 and the perimeter 226, it should be understood that the drawing is not to scale. Typically, hundreds or thousands of nanowire shells would be seen if the drawing were to scale.

Figure 3:
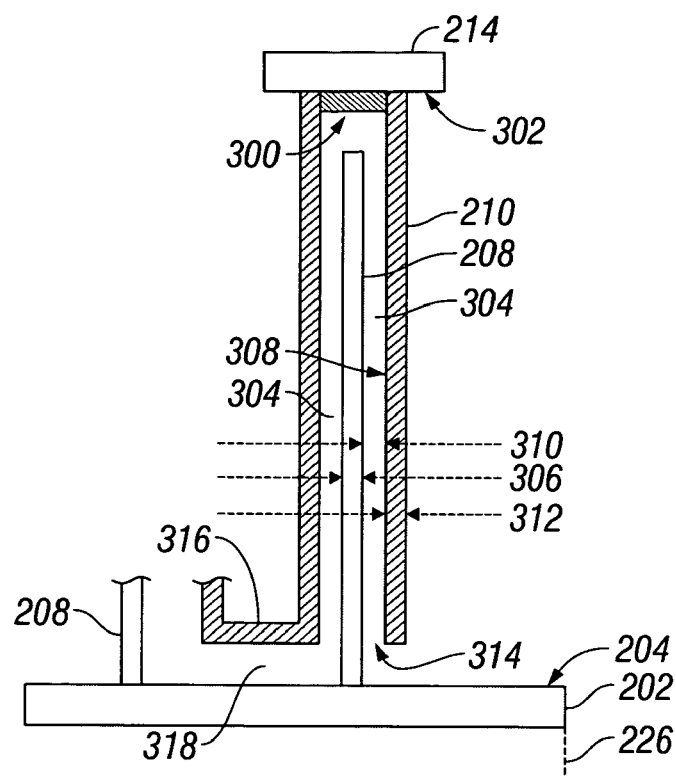
FIG. 3 is a cross-sectional view more closely detailing the nanowire shells of FIG. 2A.

FIG. 3 is a cross-sectional view more closely detailing the nanowire shells of FIG. 2A. Each sleeve 210 has a lid 300 in contact with a bottom surface 302 of the top electrode 214. A first electrolyte cavity 304 is formed between the sleeve 210 and the nanowire 208. Each sleeve has a sleeve bottom opening 314. The sleeve bottom openings or bottom mouths 314 are joined to a shell coating layer 316 and separated from the bottom electrode top surface 204 by a second electrolyte cavity 318. The second electrolyte cavity 318 is exposed at the nanowire shell perimeter 226.

The nanowires 208 have an average diameter 306 in a range between 1 nanometer and 10 micrometers. The sleeves 210 have an inside surface 308 separated from the nanowires 208 by a spacing 310 in the range between 10 nm and 100 micrometers. Typically, each sleeve 210 has a thickness 312 in a range of about 10 nm to 100 micrometers.

In one aspect, the electrolyte cavities 304 and 318 are filled with an electrolyte having either a gas or liquid phase. Alternately, the electrolyte may have a solid phase, in which case the electrolyte cavities are filled with solid electrolyte.

Returning to FIG. 2A, the support column 222 may be a spin-on-glass (SOG) material or silicon dioxide. Other possible materials include SiN or $TiO_2$. The sleeves 210 may be a material such as Ir, IrOx, Pt, Au, Ru, RuOx, Pd, Fe, Mo, Ti, Ta, Pb, Zn, Cu, Ag, Sn, Co, Cd, W, C, Ni, Al, or Ca. The top electrode 214 and bottom electrode 202 may be materials such as Pt, Au, Ir, IrOx, Ru, or RuOx. The nanowires 208 may be made from Ir, IrOx, Pt, Au, Ru, RuOx, Pd, Fe, Mo, Ti, Ta, Pb, Zn, Cu, Ag, Sn, Co, Cd, W, C, Ni, Al, or Ca.

FIG. 2B depicts a NEC cell 200 where the sleeve lids and shell coating layer (see FIG. 3) are not present. Alternately stated, each sleeve 210 has a top opening or mouth 260 in contact with the bottom surface 302 of the top electrode 214. The sleeve bottom openings 314 are not joined to a shell coating layer, as they are in FIGS. 2A and 3. As shown, the first electrolyte cavity 304 is filled with a solid electrolyte 262. Alternately, since the sleeves are supported through attachment to the bottom surface of the top electrode, a liquid or gas electrolyte may also be used.

Functional Description

Figure 4:
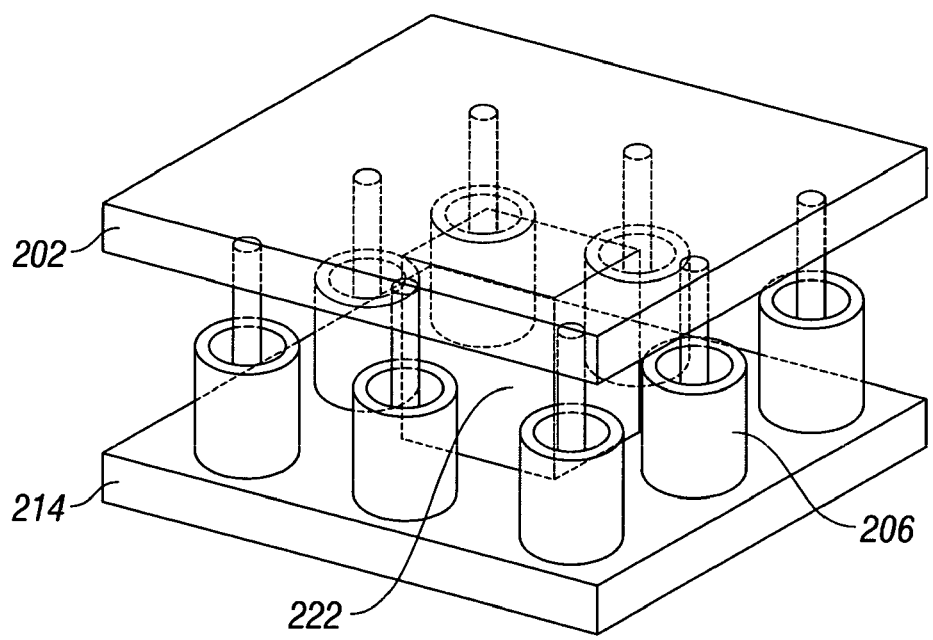
FIG. 4 is a perspective view of the NEC cell of FIG. 2B as seen from below.

FIG. 4 is a perspective view of the NEC cell of FIG. 2B as seen from below. The core nanowires are connected to the bottom electrode 202 and the shell nanotube or sleeve is connected to the top electrode 214. Chemical vapor, gases, or liquids can pass through the gaps between the two electrodes. The high surface area and nanospaces between the cores and sleeves significantly improve the efficiency of the electrochemical cell for fabricating, plating, or dissociating chemicals.

Figure 5A:
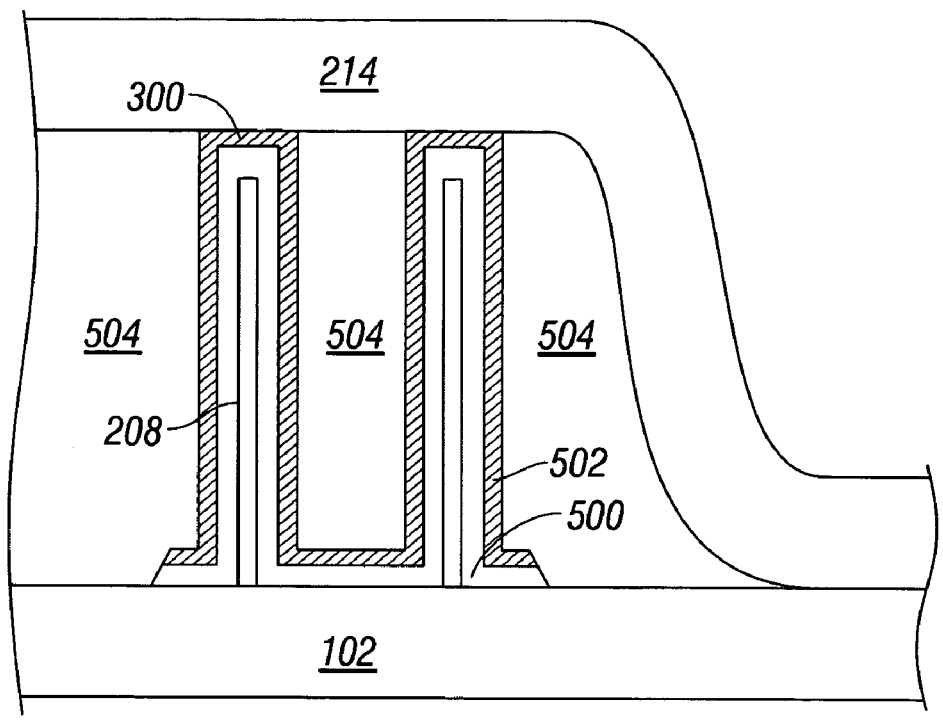
FIGS. 5A, 5B, and 6 depict steps in the process of fabricating the NEC cell of FIGS. 2A and 2B.
Figure 5B:
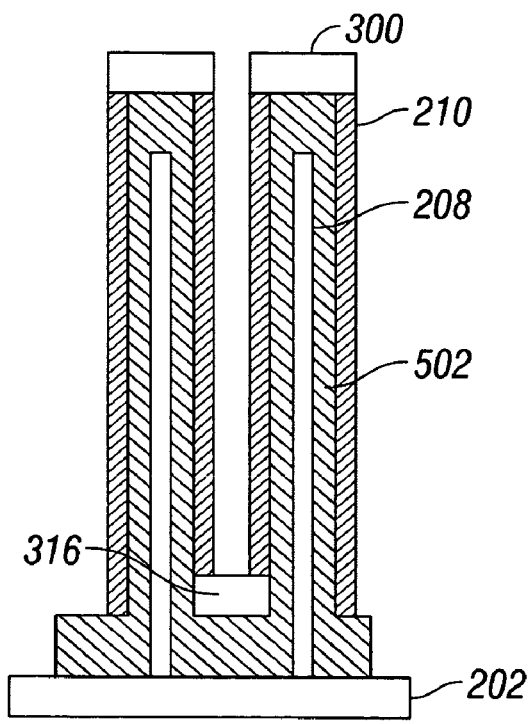
Figure 6:
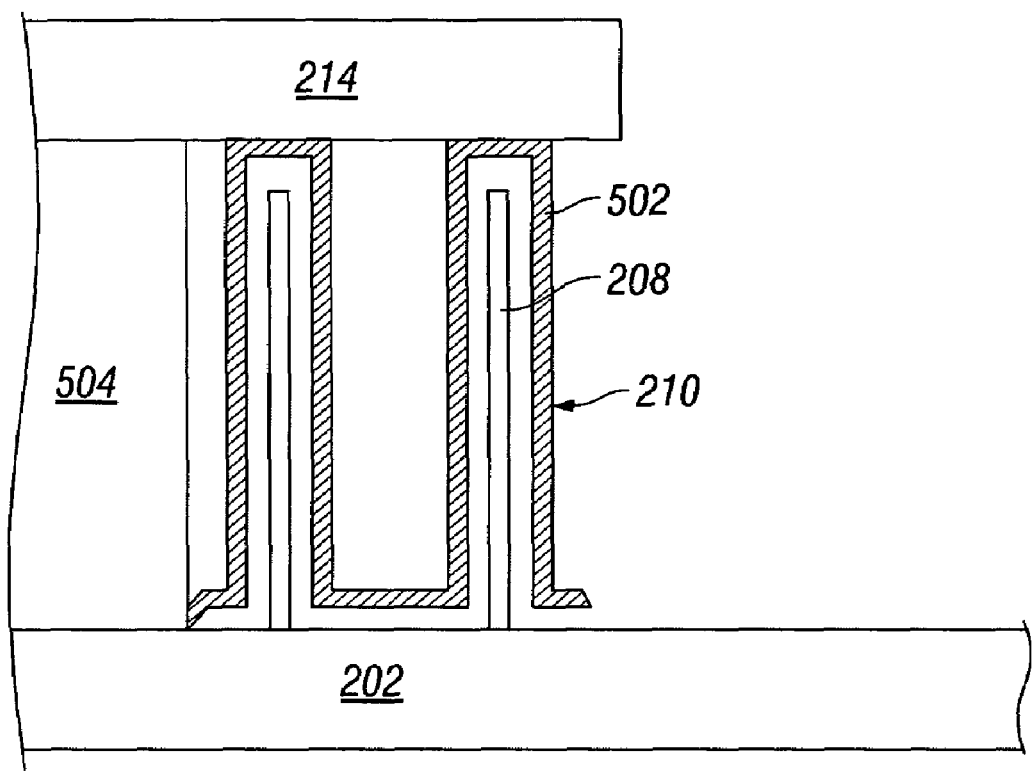

FIGS. 5A, 5B, and 6 depict steps in the process of fabricating the NEC cell of FIGS. 2A and 2B. In FIG. 5A, the nanowires are first formed on the bottom electrode. Then, a first sacrificial coating 500, such as $SiO_2$, ZnO, or Ge is uniformly coated on the nanowires 208 using, for example, an atomic layer deposition (ALD), physical vapor deposition (PVD), or chemical valor deposition (CVD) process. The first sacrificial layer 500 is covered with a shell coating 502. Again, ALD, PVD, or CVD processes may be used. The shell-coated nanowires are then buried with a second sacrificial layer 504 using, for example, a spin on insulating layer such as spin-on-glass (SOG). Annealing is optional, to densify the SOG layer. Then, a wet or dry etch step, or a CMP step is performed to planarize the surface, just exposing the sleeve lids 300. After planarization, the top electrode material 214 is deposited on the surface.

In FIG. 5B an additional step is performed to obtain the NEC cell of FIG. 2B. After the shell coating, but before the deposition of the second sacrificial layer and planarization, anisotropic etching steps are performed, which are similar to the dry etching process used to form gate spacers in a conventional IC transistor fabrication process. This etch removes the lid 300 and the shell coat layer 316, stopping on the first sacrificial layer 502, leaving the sleeves 210 in tact. Then, the second sacrificial layer is deposited (not shown) and planarization is performed, stopping on first sacrificial layer 502.

In FIG. 6, a stack etching is performed on the structure of FIG. 5A, down to the level of the bottom electrode 202, exposing the first sacrificial layer. Then, wet etchings are performed that selectively etch off the first and second sacrificial layers 500/504 (see FIG. 5A), either separately or at the same time, producing spaces between the sleeves 210 and nanowires 208. The etching steps leave the center part of the insulating layer (SOG) intact for supporting the structure. Any metal/alloy can be selected as the electrochemical electrode material, to perform the chemical reaction required of the cell.

Figure 7:
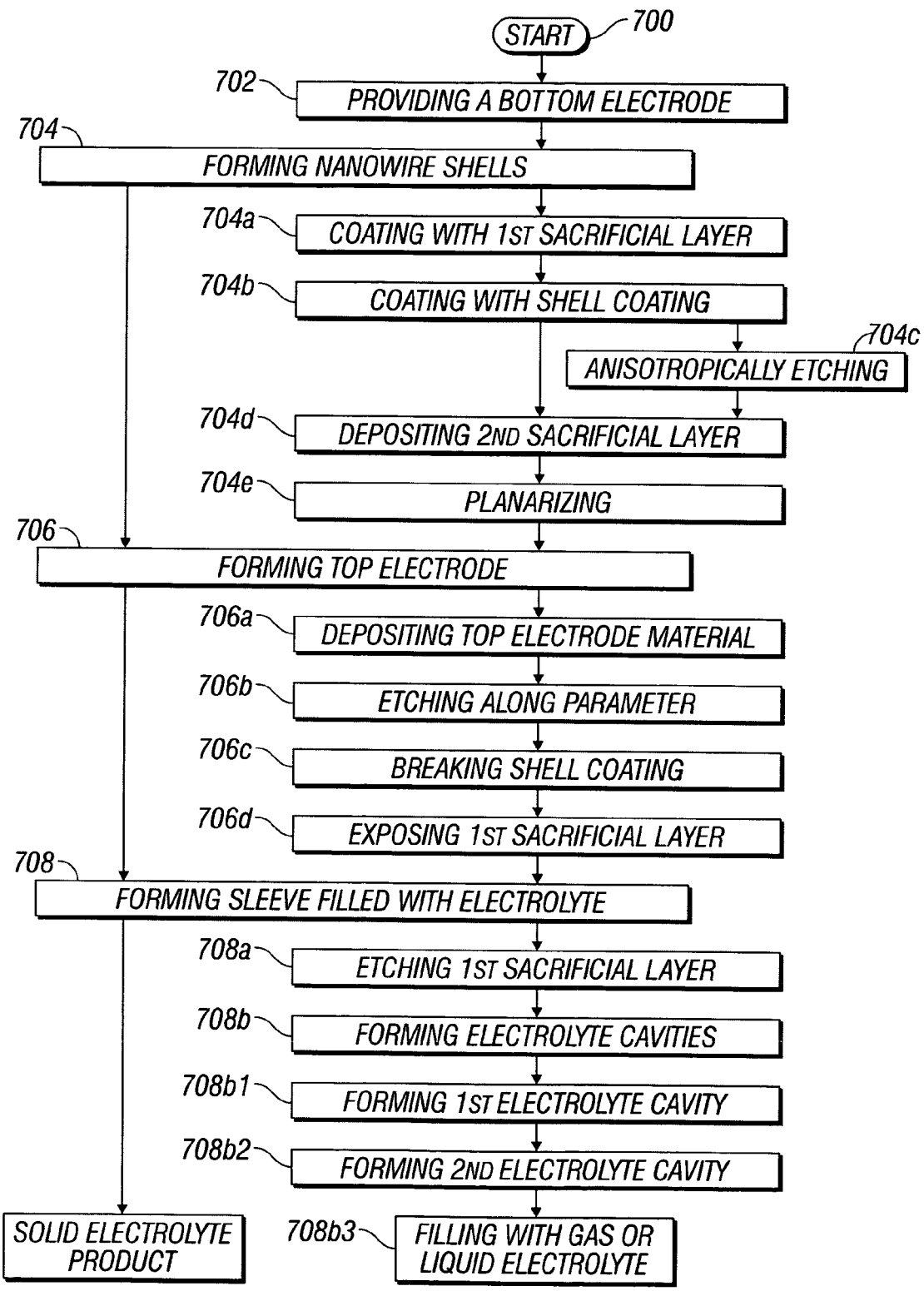
FIG. 7 is a flowchart illustrating a method for forming a NEC cell.

FIG. 7 is a flowchart illustrating a method for forming a NEC cell. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method starts at Step 700.

Step 702 provides a bottom electrode with a top surface. Step 704 forms nanowire shells. Each nanowire shell has a nanowire connected to the bottom electrode top surface. Typically, the nanowires are formed with an axis approximately normal in orientation with respect to the bottom electrode top surface. Step 706 forms a top electrode overlying the nanowire shells. Step 708 forms sleeves filled with electrolyte. Typically, Step 708 forms a main cavity between the top electrode and bottom electrodes, partially displaced by a plurality of nanowire shells.

In one aspect, forming the top electrode in Step 706 includes forming a top electrode having a perimeter with a center region. Then, forming the main cavity in Step 708 includes forming a cavity partially defined by a support column underlying the top electrode center region and extending to the bottom electrode. In another aspect, forming the main cavity includes embedding a plurality of nanowire shells in the support column.

In a different aspect, forming the plurality of nanowire shells in Step 704 includes substeps. Step 704a conformally coats the nanowires with a first sacrificial coating. Step 704*b* conformally covers the first sacrificial coating with a shell coating. Optionally, Step 704*c* anisotropically etches the shell coating, prior to depositing the second sacrificial layer, removing sleeve lids and a sleeve coating layer joining sleeve openings. Step 704*d* blanket deposits a second sacrificial layer. Step 704*e* planarizes the second sacrificial layer to the level of the shell coating. Then, forming the top electrode in Step 706 includes substeps. Step 706*a* conformally deposits a top electrode material. Step 706*b* selectively etches the top electrode outside the perimeter, down to the level of the bottom electrode top surface, forming an area of nanowire shells defined by the perimeter. In response to the etching, Step 706*c* breaks (or exposes) the shell coating along the perimeter, and Step 706*d* exposes the first sacrificial layer. Then, forming the main cavity in Step 708 includes etching the second sacrificial layer subsequent to forming the top electrode, forming the support column. For example, the first sacrificial coating may be silicon oxide, ZnO, or germanium (Ge), and the second sacrificial layer may be SOG. However, the invention is not limited to any particular types of materials.

In a gas or liquid electrolyte aspect, forming sleeves in Step 708 includes substeps. Step 708*a* etches away the first sacrificial layer, and Step 708*b* forms electrolyte cavities. Further, forming electrolyte cavities in Step 708*b* may include additional substeps. Step 708*b*1 forms a first electrolyte cavity between each sleeve and nanowire. Step 708*b*2 forms a second electrolyte cavity interposed between a shell coating layer joining sleeve openings, and the bottom electrode top surface. Step 708*b*3 fills the main and electrolyte cavities with an electrolyte having either a gas or liquid phase.

In one aspect, forming the first sacrificial layer (Step 704*a*) and forming the second sacrificial layer (Step 704*d*) include forming the first and second sacrificial layers from a common material. Then, forming the main cavity and the electrolyte cavities in Step 708 includes forming the main and electrolyte cavities in a common etching step.

Alternately, Step 704*a* conformally coats the nanowires with a solid phase electrolyte as the first sacrificial layer. In this aspect, the first sacrificial layer is not etched away, and the implications of the term "sacrificial" may be misleading.

A nanostructure support structure has been presented. One use for the support structure is in an NEC cell. But, the structure is not limited to just this use. Likewise, a NEC cell and corresponding fabrication process have been presented. Fabrication details and materials have been used to illustrate the invention. However, the invention is not limited to just these examples. Other variations and embodiments of the invention will occur to those skilled in the art.

We claim:

1. A method for forming a NanoElectroChemical (NEC) cell, the method comprising:
   providing a bottom electrode with a top surface;
   forming nanowire shells, each nanowire shell having a nanowire connected to the bottom electrode top surface;
   forming a top electrode overlying the nanowire shells; and,
   forming nanowire sleeves filled with electrolyte.

2. The method of claim 1 wherein forming nanowire sleeves includes forming a main cavity between the top electrode and bottom electrodes, partially displaced by a plurality of nanowire shells.

3. The method of claim 2 wherein forming the top electrode includes forming a top electrode having a perimeter with a center region; and,
   wherein forming the main cavity includes forming a cavity partially defined by a support column underlying the top electrode center region and extending to the bottom electrode.

4. The method of claim 3 wherein forming the main cavity includes embedding a plurality of nanowire shells in the support column.

5. The method of claim 2 wherein forming nanowire shells includes forming nanowires with an axis approximately normal in orientation with respect to the bottom electrode top surface.

6. The method of claim 5 wherein forming the plurality of nanowire shells includes:
   conformally coating the nanowires with a first sacrificial coating;
   conformally covering the first sacrificial coating with a shell coating;
   blanket depositing a second sacrificial layer; and,
   planarizing the second sacrificial layer to the level of the shell coating; and,
   wherein forming the top electrode includes:
   conformally depositing a top electrode material;
   selectively etching the top electrode outside the perimeter, down to the level of the bottom electrode top surface, forming an area of nanowire shells defined by the perimeter; and,
   in response to the etching, breaking the shell coating along the perimeter; and
   exposing the first sacrificial layer.

7. The method of claim 6 wherein forming the main cavity includes partially etching the second sacrificial layer subsequent to forming the top electrode, forming the support column.

8. The method of claim 6 wherein forming the plurality of nanowires shells further includes anisotropically etching the shell coating prior to depositing the second sacrificial layer, removing sleeve lids and a sleeve coating layer joining sleeve bottom openings.

9. The method of claim 6 wherein forming sleeves includes:
   etching away the first sacrificial layer;
   forming electrolyte cavities; and,
   filling the electrolyte cavities with an electrolyte having a phase selected from a group consisting of liquid and gas.

10. The method of claim 9 wherein forming electrolyte cavities includes:
    forming a first electrolyte cavity between each sleeve and nanowire; and,
    forming a second electrolyte cavity interposed between a shell coating layer joining sleeve bottom openings, and the bottom electrode top surface.

11. The method of claim 9 wherein forming the first sacrificial layer and forming the second sacrificial layer include forming the first and second sacrificial layers from a common material; and,
    wherein forming the main cavity and the electrolyte cavities includes forming the main and electrolyte cavities in a common etching step.

12. The method of claim 6 wherein conformally coating the nanowires with the first sacrificial layer includes covering the nanowires with a solid phase electrolyte.

13. A NanoElectroChemical (NEC) cell, the NEC cell comprising:
    a bottom electrode with a top surface;
    a plurality of nanowire shells, each nanowire shell having a nanowire and a sleeve, with the nanowire connected to the bottom electrode top surface having an axis approximately normal in orientation with respect to the bottom electrode top surface, and with each sleeve having a first electrolyte cavity formed between the sleeve and the nanowire, and a sleeve bottom opening;

a top electrode overlying the nanowire shells;

a main cavity between the top electrode and bottom electrode, partially displaced by a first plurality of nanowire shells: and, wherein the nanowire shells are formed in an area defined by a perimeter aligned with a top electrode perimeter.

14. The NEC cell of claim 13 wherein the top electrode perimeter has a center region; and, the NEC cell further comprising:

a support column underlying the top electrode center region and extending to the bottom electrode top surface, partially defining the main cavity.

15. The NEC cell of claim 14 wherein a plurality of nanowire shells are embedded in the support column.

16. The NEC cell of claim 13 wherein each sleeve has a lid in contact with a bottom surface of the top electrode and a plurality of sleeves bottom openings are joined to a shell coating layer separated from the bottom electrode top surface by a second electrolyte cavity, and wherein the second electrolyte cavity is exposed at the nanowire shell perimeter.

17. The NEC cell of claim 13 wherein each sleeve has a top opening in contact with a bottom surface of the top electrode, and the sleeve bottom openings are not joined to a shell coating layer.

18. The NEC cell of claim 13 wherein the electrolyte cavities are filled with an electrolyte having a phase selected from a group consisting of solid, liquid, and gas.

19. A nanowire support structure, the support structure comprising:

a bottom substrate with a top surface;

a plurality of nanowire shells, each nanowire shell having a nanowire and a sleeve with a top opening and a bottom opening, with the nanowire connected to the bottom substrate top surface; and, sleeve cavities interposed between each sleeve and nanowire.

20. A nanowire support structure, the support structure comprising:

a bottom substrate with a top surface;

a plurality of nanowire shells, each nanowire shell having a nanowire and a sleeve, with the nanowire connected to the bottom substrate top surface and with each sleeve having a lid and a sleeve bottom opening;

sleeve cavities interposed between each sleeve and nanowire;

a shell coating layer overlying the bottom substrate top surface and joining the plurality of sleeve bottom openings; and, a surface cavity interposed between the shell coating layer and the bottom substrate top surface.

* * * * *